2,777,849

1,1'-ALKYLENEDIPIPERAZINES AND METHODS OF PREPARING SAME

Frederick L. Bach, Jr., and Herbert J. Brabander, Pearl River, and Samuel Kushner, Nanuet, N. Y., assignors to American Cyanamid Company, New York, N. Y., a corporation of Maine No Drawing. Application July 23, 1954, Serial No. 445,452

4 Claims. (Cl. 260—268)

This invention relates to a new series of organic compounds. More particularly, this invention relates to certain 1,1'-alkylenedipiperazines, their quaternary and mineral acid salts, and methods for their preparation.

Considerable difficulty has been encountered in the past in the synthesis of orally active, non-toxic, adrenergic blocking agents. This is particularly true where such compounds are intended for use in the treatment of hypertensive states. In such cases the prescribed course of therapy usually requires administration of the drug over a prolonged period of time. If the drug is toxic, such prolonged administration may result in the manifestation of undesirable side effects such as headache, nasal congestion, drowsiness, nausea, myosis, diarrhea and tachycardia.

We have now discovered a series of synthetic organic compounds which are extremely effective as hypotensive agents and vasodilators. The compounds of the present invention have an effective dose in the range of 0.5 milligram per kilogram of body weight, are relatively non-toxic and may be administered orally. The latter property is most advantageous inasmuch as many of the available hypotensive agents must be administered intravenously in order to produce a maximal physiological response.

Another desirable property of the compounds of the present invention resides in their ability to induce long term blood pressure depression with one effective dose. Thus, following administration of one average dose, blood pressure may remain reduced for a period longer than 5 hours without the necessity for repeated administration.

The compounds of the present invention are those having the following general formula:

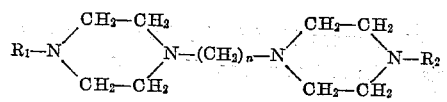

wherein $n$ is a positive integer from 2 to 10, $R_1$ is a phenyl radical and $R_2$ is a heterocyclic radical. As examples of heterocyclic substituents may be given pyrimidyl, pyridyl, and pyrazinyl. The quaternary and mineral acid salts of these compounds are intended to be included within the scope of the present invention.

It is preferred that an inert organic solvent also be present in the reaction mixture. Among the solvents which may be used are the lower alkyl alcohols such as methanol, ethanol and propanol; benzene, toluene, chlorobenzene, dioxane, chloroform and aqeous-alcoholic mixtures. In addition, organic bases such as pyridine, quinoline and the like may be used. These latter compounds have the advantage of serving both as solvents, and acid acceptors for neutraliing the excess acid formed during the course of the reaction.

Although our preferred mode of carrying out the reaction is one in which an organic solvent is employed, it is possible to carry out the condensation in the absence of such solvent. An excess quantity of the piperazine starting material is used in such cases. The piperazine being basic in character, acts as the acid acceptor in lieu of the organic solvent.

Any alkali metal carbonate, bicarbonate or hydroxide may be used as the base in lieu of the sodium bicarbonate in the above reaction, as for example potassium or sodium hydroxide, potassium or sodium carbonate and the like. In addition, the alkali metal amides may be used, as for example sodamide or potassium amide.

It is preferred to carry out the reaction at reflux temperatures in order to minimize the time required for the reaction to reach completion. Although lower temperatures such as room temperature are suitable, a longer period of time may be required when this is done. A period of about 1–30 hours is sufficient when the reaction is carried out at reflux temperature, whereas a week or more may be required at room temperature. If the reaction is carried out at reflux in the absence of a solvent, the solids are fused before being subjected to refluxing.

The quaternary or mineral acid salts of the compounds of the present invention may be readily prepared by known methods. For example, the di-piperazine base may be treated with methyl iodide in the presence of an inert organic solvent in which the base is soluble, as for example benzene, ether, chloroform, and the like. Upon standing at room temperature for a period of about 1 hour to 3 days, depending upon the nature of the base used, the quaternary salt is deposited from solution. In a similar manner, treatment of the di-piperazine base with a hydrohalogen gas such as hydrogen chloride or hydrogen bromide, or a mineral acid such as sulfuric or phosphoric acid, results in the formation of the corresponding salt. It is preferred to carry out the reaction in the presence of an inert non-hydroxylic organic solvent such as benzene, chloroform or toluene.

In order to obtain maximum yields, a slight modification of the above procedure is necessary for the purpose of minimizing the formation of spiro compounds. These compounds are usually formed in cases where "$n$" in the above general formula is equal to 4 or 5. Accordingly, when it is intended to prepare a compound of this type, the haloalkane is added drop-wise to a refluxing mixture of the piperazine starting material in the presence of the base. Since the amine is present initially in large excess, the formation of a spiro piperazinium compound is minimized. In the event any spiro compound is formed however, it may be readily removed by washing the cooled reaction mixture with water. The spiro quaternary compound dissolves in water, whereas the basic alkylenedipiperazine does not.

A still further modification of the present invention may be readily effected when it is desired to prepare unsymmetrical compounds, as for example when it is desired to prepare a compound wherein $R_1$ in the above general formula is a phenyl radical, and $R_2$ is a pyridyl radical. In such cases it is preferable first to prepare a 1-omega-haloalkyl-4-substituted piperazine and then react that compound with a 1-substituted piperazine. The last step of the reaction may be more readily exemplified by the following equation:

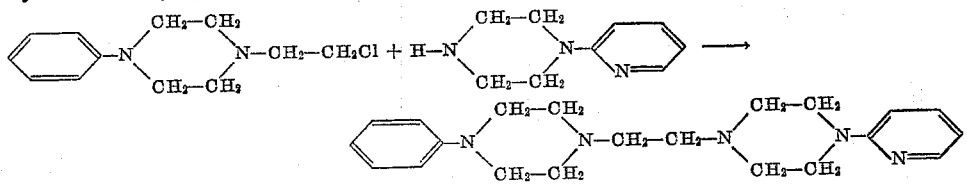

In more particular detail it may be stated that the 1-omega-haloalkyl-4-substituted piperazine shown above may first be prepared by reacting a 1-substituted piperazine with a polymethylene halohydrin such as ethylenebromhydrin or propylenechlorhydrin in the presence of a suitable basic carrier, as for example an alkali metal carbonate. We prefer to use sodium bicarbonate for this purpose. The condensation is preferably carried out at reflux temperature in the presence of water-ethanol or other suitable organic solvents such as a lower alkyl alcohol, chloroform or dioxane.

The resulting piperazine is then halogenated in the presence of an inert solvent at a temperature varying from about 0° C. to about 10° C. Although the preferred halogenating agent for this reaction is thionyl chloride, others may be used, as for example phosphorus tribromide, phosphorus pentachloride or phosphorus oxychloride. The solvents we prefer to use in this reaction are those of the non-hydroxylic type, as for example ether, chloroform, carbon tetrachloride, benzene, toluene and similar known carriers.

The object of the condensation reaction is, of course, to replace the available hydroxy group with a halogen. Once this is done, the substituted piperazine may be further condensed with another piperazine, the latter preferably being employed in the form of its salt or free base.

The following examples illustrate our invention in more particular detail, but are not intended to be limitative upon the scope thereof. All parts are by weight unless otherwise indicated.

*Example*

A solution consisting of 17.2 grams (0.06 mole) of 1-(β-chloroethyl - 4 - phenylpiperazine dihydrochloride, 9.8 grams (0.06 mole) of 1-(2-pyridyl)piperazine, and 20.2 grams (0.24 mole) of sodium bicarbonate in 100 ml. of ethanol was refluxed approximately 15 hours. At the end of this time this solution was concentrated to a brown, oily residue which was made strongly alkaline with concentrated potassium hydroxide solution (10 ml.) and extracted with chloroform. The extract was treated with activated charcoal, dried over magnesium sulfate, and concentrated under vacuum to a yellowish brown oil. This oily residue was treated with an 85% ethanol-water solution, and the granular material separated. The crude yield of 1-[-1-(4-phenyl)piperazinyl]-2-[[1-[4-(2-pyridyl)-piperazinyl]]]ethane was recrystallized from ethanol-water solution and melted over a constant range of 77–81° C.

Other compounds of the invention include 1-[1-(4-phenyl)piperazinyl] - 2 - [[1 - [4 - (2 - pyrimidyl)]piperazinyl]]ethane, prepared by reacting 1-(β-chloroethyl)-4-phenylpiperazine with 1-(2-pyrimidyl)piperazine; 1-[1-(4 - phenyl)piperazinyl] - 3 - [[1 - [4 - (2 - pyrazinyl)]piperazinyl]]propane prepared by reacting 1-(γ-chloropropyl) - 4 - phenylpiperazine with 1 - (2 - pyrazinyl)piperazine; 1-[1-(4-phenyl)piperazinyl]-2-[[[1-[4-[2-(5-chloropyrimidyl)]]]piperazinyl]]]ethane prepared by reacting 1-(β-chloroethyl)-4-phenylpiperazine with 1-[2- (5- chloropyrimidyl)]piperazine; 1 -[1- (4- p-chlorophenyl)piperazinyl]-2 - [[1-[4-(2-pyridyl)]piperazinyl]]-ethane prepared by reacting 1-(β-chloroethyl)-4-p-chlorophenylpiperazine with 1-(2-pyridyl)piperazine.

We claim:
1. 1-[1- (4- phenyl)piperazinyl]-2-[[1-[4-(2-pyridyl)]-piperazinyl]]ethane.

2. A method of preparing 1-[1-(4-phenyl)piperazinyl]-2-[[1-[4-(2-pyridyl)]piperazinyl]] ethane which comprises reacting 1-(β-chloroethyl)-4-phenylpiperazine dihydrochloride with 1-(2-pyridyl)piperazine in the presence of an alkali metal bicarbonate.

3. Compounds selected from the group consisting of those having the general formula

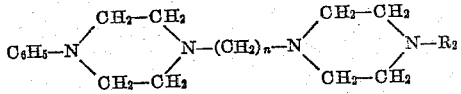

wherein $n$ is a positive integer from 2 to 10, $R_2$ is a member of the group consisting of pyridyl and pyrimidyl radicals and the therapeutically useful quaternary and mineral acid salts thereof.

4. A method of preparing unsymmetrical piperazines having the general formula

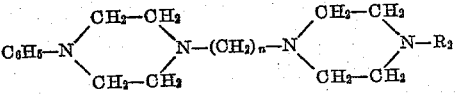

wherein $n$ is a positive integer from 2 to 10 and $R_2$ is a member of the group consisting of pyridyl and pyrimidyl radicals which comprises the steps of reacting a member of the group consisting of N-pyridyl piperazine and N-pyrimidyl piperazine with a 1-(omega-haloalkyl)-4-phenyl piperazine having the formula

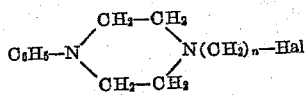

wherein $n$ is as defined above and Hal is halogen in the presence of an acid acceptor.

References Cited in the file of this patent
Davis et al.: J. Chem. Soc. (London), 1949, 2831–4.